Aug. 4, 1925.
C. E. WADE
METAL WHEEL
Filed Oct. 7, 1921
1,548,230
2 Sheets-Sheet 1
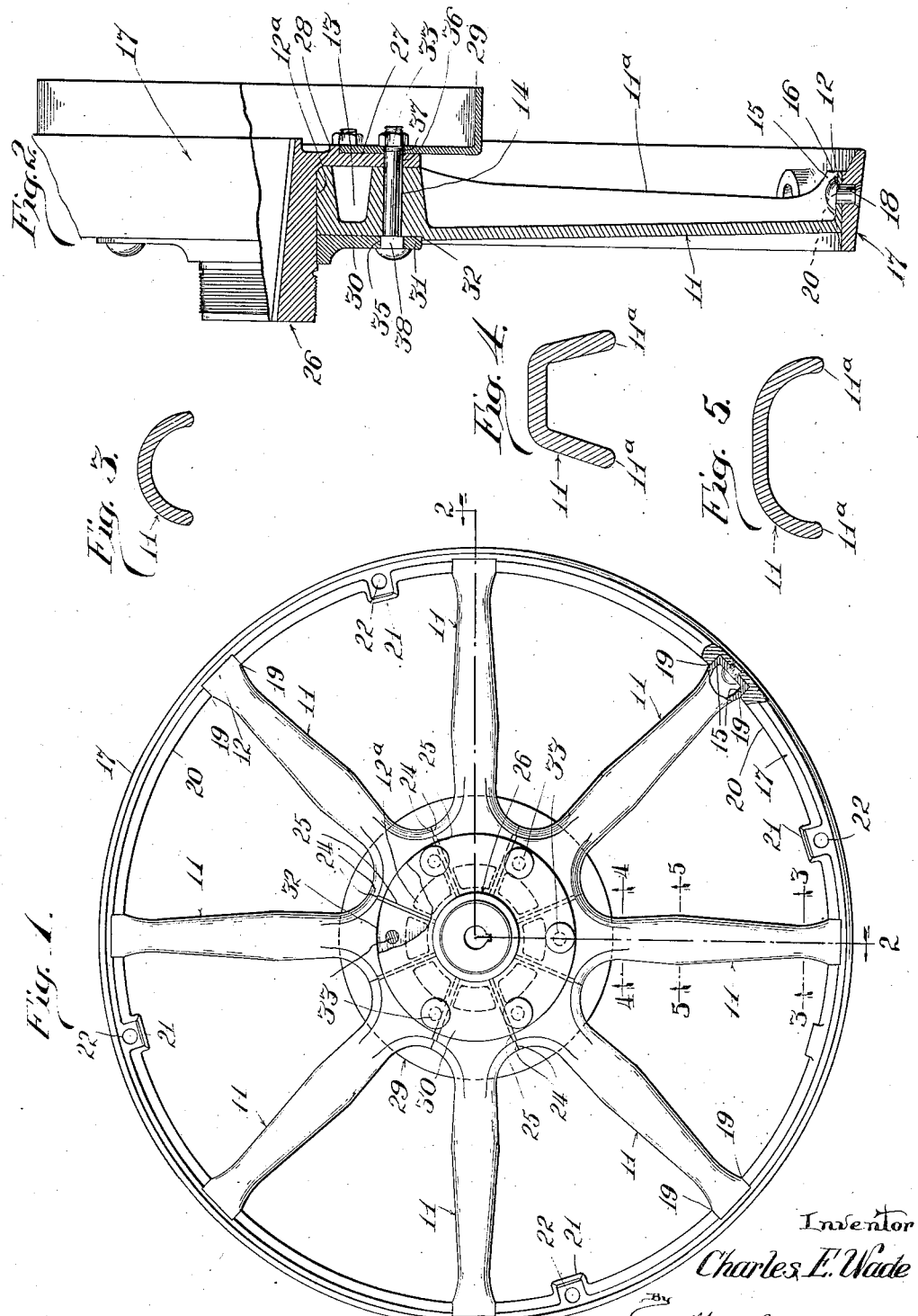
Inventor
Charles E. Wade

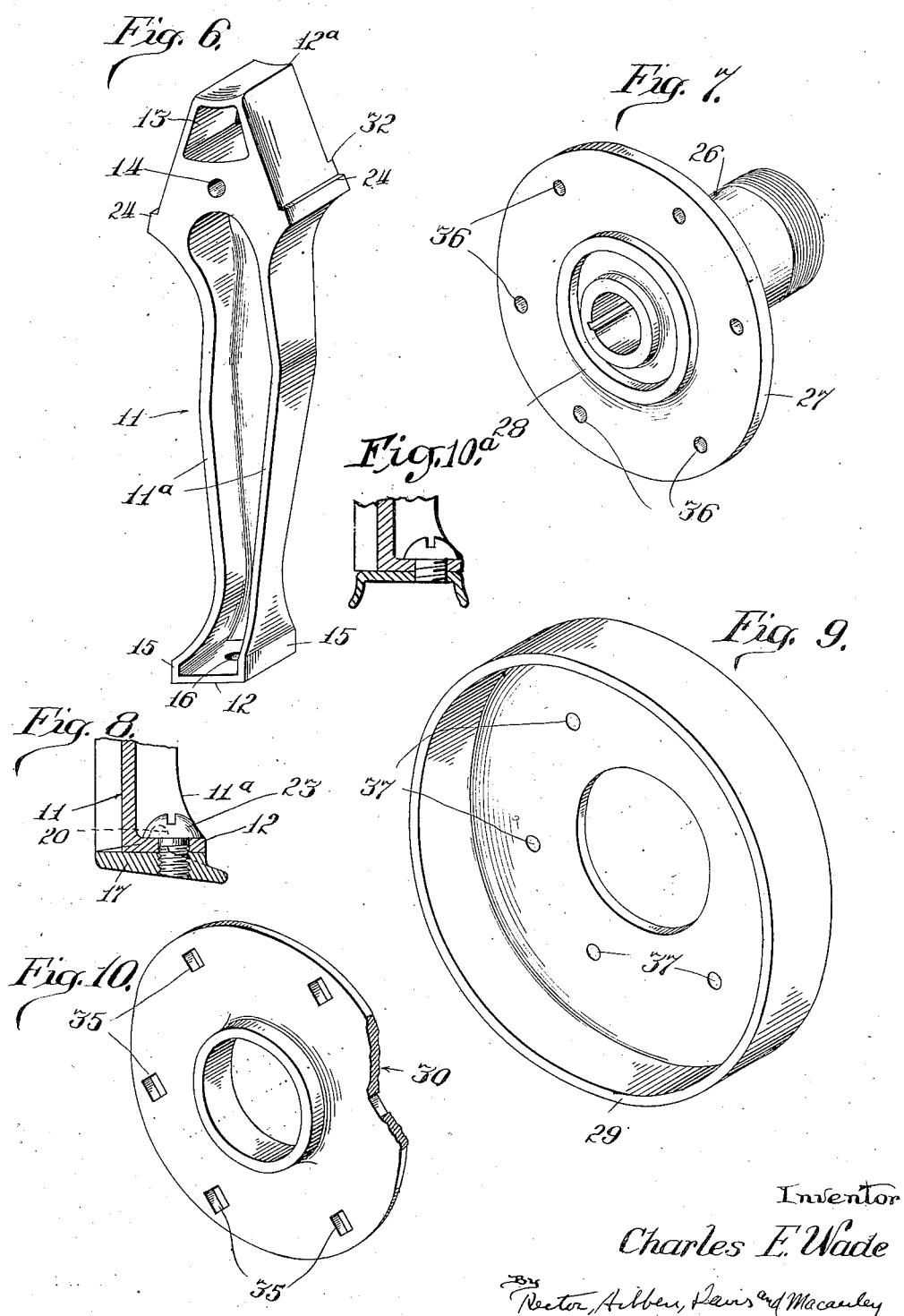

Patented Aug. 4, 1925.

1,548,230

UNITED STATES PATENT OFFICE.

CHARLES E. WADE, OF DETROIT, MICHIGAN, ASSIGNOR TO JEFFERSON FORGE PRODUCTS COMPANY, OF DETROIT, MICHIGAN, A CORPORATION OF MICHIGAN.

METAL WHEEL.

Application filed October 7, 1921. Serial No. 506,034.

*To all whom it may concern:*

Be it known that I, CHARLES E. WADE, a citizen of the United States, residing at Detroit, in the county of Wayne and State of Michigan, have invented certain new and useful Improvements in Metal Wheels, of which the following is a specification.

My invention relates to vehicle wheels and has for its general object to provide a metal wheel which is light in weight, strong, durable, simple, easily and cheaply manufactured and readily assembled.

One of the particular objects of my invention is to provide a construction wherein the spokes and felloe are separately formed, preferably forged, and so designed as to afford an easy and quick assembly of the spokes and felloe into a unitary structure adapted to be mounted on various types of hubs with equal facility and at the same time possessing the advantages enumerated above.

Other and further objects and advantages of my improved wheel will become apparent from the following description, taken in conjunction with the accompanying drawings wherein I have shown an embodiment of my invention in an automobile wheel for purposes of disclosure but without intent to limit the invention in some of its aspects to this particular utilization.

In the drawings, Fig. 1 is a side elevation showing a wheel structure embodying my invention; Fig. 2 is an end elevation of the wheel with the lower half in section, as on the line 2—2 of Fig. 1; Figs. 3, 4 and 5 are spoke sections on lines 3—3, 4—4 and 5—5, respectively, of Fig. 1; Fig. 6 is a perspective view of one of the spoke units; Fig. 7 is a perspective view of the hub; Fig. 8 is a fragmentary sectional view showing modified means for securing the spokes to the felloe; Fig. 9 is a perspective view of the brake drum; Fig. 10 is a perspective view of the detachable hub disk and Fig. 10ª is a fragmentary section showing a rim attached to a spoke.

Throughout the drawings like numerals of reference refer to like parts.

Each spoke 11, which is preferably forged, is channeled or pari-tubular in cross-section, the walls of the channeled portion being relatively thin. The outer end of the channel is closed by an integral web or plate 12. The inner end portion of the spoke is wedge-shaped and its extreme inner end 12ª is curved to conform to the hub of the wheel as will be pointed out hereinafter. The wedge-shaped end, which is solid except for a recess 13 and an aperture 14, is thicker (that is transversely to the plane of the wheel) than the channeled portion of the spoke and the edges 11ª of the sides of the channeled portion are curved inwardly adjacent the wedge-shaped end so that they merge with the inner face of the wedge-shaped portion. The outer ends of the edges 11ª also curve inwardly but the curves terminate short of the end web 12 to form flanges or projecting portions 15 to give added strength to the spoke adjacent the web. The recess 13 in the wedge-shaped end of the spoke is provided to reduce the weight of the spoke.

The spokes at their outer ends are preferably secured to a felloe 17 by means of rivets 18 (Fig. 2) which project through apertures 16 in the webs 12 and corresponding apertures in the felloe 17, the openings in the felloe being countersunk or tapered to accommodate the flattened outer ends of the rivets. The felloe, which is also preferably forged, is provided on its inner periphery with a rib or flange 20 which is provided at regular intervals with recesses 19 to receive the ends of the spokes. The felloe is also provided with integrally forged lugs 21 (Fig. 1) at suitable intervals, apertures 22 being made therein for receiving the usual retaining bolts for the demountable rim, which is not shown in the drawings.

If desired the outer ends of the spokes may be secured to the felloe by a welding operation, in which case the use of rivets would be eliminated, or, if preferred, cap screws 23, as shown in Fig. 8, may be employed for securing the spokes to the felloe, the apertures in the felloe being screw threaded to receive the threaded ends of the screws.

When the spokes have been assembled to the felloe, as above described, their wedge-shaped inner ends form in effect a substantially complete disk or solid center except for the central opening formed by the curved ends of the spokes to accommodate a hub. Shoulders or flanges 24 formed on the converging sides of the wedge-shaped end of each spoke contact with the corresponding shoulders on the contiguous or adjacent spokes and shims 25 of fibre or other suitable material are positioned between the adjoining surfaces (between the shoulders 24 and the inner ends of the spokes) to prevent noise and to take up any slight irregularities in the adjacent surfaces which might occur in the course of manufacture.

The hub 26 which is also preferably forged, is provided with the usual integral flange 27 having an annular rib 28 for centering a brake-drum 29 on the flange 27. A separate disk 30 is mounted on the outer end of the hub and the outer faces of the wedge-shaped ends of the spokes are preferably segmentally recessed to form the annular shoulders 32, the disk 30 being positioned in the recesses and contacting at its periphery with the annular shoulder 32 to accurately center the spokes on the hub. The spokes and the disk 30 are secured firmly to the flange 27 of the hub by means of bolts 33 which project through suitable holes or apertures 14, 35, 36 and 37 formed respectively in the spokes, disk 30, flange 27 and brake drum 29. The apertures 35 in the disk 30 are square and receive the squared portions 38 of the bolts 33 to prevent the latter from turning.

The ends of the spokes, in contact with the tubular portion of the hub 26, are machined to form the curvature referred to above, the curvature being of the same radius as the outer cylindrical surface of the tubular portion of the hub so that the ends of the spokes may be accurately and firmly seated on the tubular portion. It will be observed, that in the assembled wheel the spokes are slightly dished from the annular shoulder 32 to the felloe to give added strength to the wheel. It is also apparent that after the spokes have been assembled on the felloe, the spokes with the felloe constitute a unitary structure which may be mounted on any suitable and desired form or shape of hub, whether for a front or rear wheel, thus permitting utilization of such unit for use on hubs of different makes of automobiles and other vehicles.

It is obvious, that instead of employing a felloe and a separate detachable rim, the rim may be mounted directly on the spokes in the same manner as is the felloe, thus eliminating the use of a felloe, and this is preferable when the rim is adapted to take a straight wall tire.

The construction described above compares favorably with wooden wheels in lightness while far excelling them in strength and lends itself to artistic design without sacrifice of the quality of adaptability and of economy in quantity manufacture, the structure being adapted for use on different types of hubs and being cheaply manufactured and readily assembled.

While I have herein described in some detail a particular embodiment of my invention for purposes of full disclosure it will be understood by those skilled in the art that many changes in detail might be made without departure from the spirit of my invention, hereinafter claimed.

I claim:

1. In a metal wheel, the combination of a hub, a plurality of forged spokes channel-shaped in cross-section and having wedge-shaped inner ends with solid portions, and means extending through said solid portions for detachably securing the spokes to said hub.

2. In a metal wheel, the combination of a hub, metal spokes wedge-shaped at their inner ends and having shoulders formed on the sides of their wedge-shaped portions and in contact with the shoulders on the adjacent spokes, separate shims between the spokes and within the shoulders, and means for securing the spokes to the hub unit.

CHAS. E. WADE.